United States Patent
Arimoto et al.

[11] Patent Number: 5,528,423
[45] Date of Patent: Jun. 18, 1996

[54] INNER FOCUSING ZOOM LENS SYSTEM

[75] Inventors: Tetsuya Arimoto; Soh Ohzawa, both of Sakai, Japan

[73] Assignee: Minolta Co., Ltd., Osaka, Japan

[21] Appl. No.: 324,748

[22] Filed: Oct. 19, 1994

[30] Foreign Application Priority Data

Oct. 19, 1993 [JP] Japan .................................. 5-261300

[51] Int. Cl.⁶ .................................................. G02B 15/14
[52] U.S. Cl. ........................ 359/687; 359/684; 359/686
[58] Field of Search .................................... 359/683, 684, 359/686, 687, 688

[56] References Cited

U.S. PATENT DOCUMENTS

| | | | |
|---|---|---|---|
| 4,626,076 | 12/1986 | Oshima et al. | 359/688 |
| 4,720,180 | 1/1988 | Asano et al. | 359/687 |
| 4,906,079 | 3/1990 | Mihara et al. | 359/687 |
| 5,134,524 | 7/1992 | Hamano et al. | 359/683 |
| 5,144,488 | 9/1992 | Endo et al. | 359/686 |
| 5,168,402 | 12/1992 | Mihara | 359/684 |
| 5,337,187 | 8/1994 | Fukino et al. | 359/687 |
| 5,347,399 | 9/1994 | Yoneyama et al. | 359/686 |

FOREIGN PATENT DOCUMENTS

| | | |
|---|---|---|
| 4293008 | 10/1992 | Japan . |
| 675167 | 3/1994 | Japan . |

*Primary Examiner*—Georgia Y. Epps
*Assistant Examiner*—Michael A. Papalas
*Attorney, Agent, or Firm*—Price, Gess & Ubell

[57] ABSTRACT

The present invention relates to a zoom lens system used for photo-taking in a 35 mm single lens reflex camera. The zoom lens system consists of, from the object side, a first lens unit having a positive refractive power, a second lens unit having a negative refractive power, a third lens unit having a positive refractive power, and a fourth lens unit having a positive refractive power. Zooming from a wide-angle side to a telephoto side takes place by moving all of the first lens unit through the fourth lens unit to the object side. Focusing on an object at a short distance is performed by moving the second lens unit to the object side.

18 Claims, 8 Drawing Sheets

FIG. 7a
FNO=4.60

SPHERICAL ABERRATION
(SINE CONDITION)

FIG. 7b
Y'=21.63

ASTIGMATISM

FIG. 7c
Y'=21.63

DISTORTION %

FIG. 8a
FNO=3.60

SPHERICAL ABERRATION
(SINE CONDITION)

FIG. 8b
Y='2.63

ASTIGMATISM

FIG. 8c
Y'=21.63

DISTORTION %

FIG. 13a
FNO = 4.60

-0.2   0.2
SPHERICAL ABERRATION
(SINE CONDITION)

-0.2   0.2
ASTIGMATISM

-2.0   2.0
DISTORTION %

— d
--- SC
--- DM
— DS

FIG. 14a
FNO = 3.60

0.2   0.2
SPHERICAL ABERRATION
(SINE CONDITION)

0.2   0.2
ASTIGMATISM 2.0   2.0
DISTORTION %

— d
--- SC
--- DM
— DS

FIG. 15
FNO=4.30
SPHERICAL ABERRATION
(SINE CONDITION)

FIG. 15
Y'=21.63
ASTIGMATISM

FIG. 15
Y'=21.63
DISTORTION %

FIG. 16a
FNO=4.60
SPHERICAL ABERRATION
(SINE CONDITION)

FIG. 16b
Y'=21.63
ASTIGMATISM

FIG. 16c
Y'=21.63
DISTORTION %

5,528,423

INNER FOCUSING ZOOM LENS SYSTEM

BACKGROUND OF THE INVENTION

1. Field of the Invention

This invention relates to a zoom lens system used for photo-taking in a 35 mm single lens reflex camera and having a shortest focal length of approximately 24 mm and a zoom ratio of 4:1.

2. Description of the Prior Art

In recent years, zoom lens systems used in single lens reflex cameras have become increasingly capable of wider angle and higher magnification photo-taking, and zoom lens systems having a shortest focal length of 28 mm to 35 mm and zoom ratios of 3:1 or 4:1 have been developed and sold commercially. Zoom lens systems of this type having a positive refractive power in the first lens unit (positive lens unit first type) are more effective in correcting aberrations. However, zoom lens systems of this type have the shortcoming that the shortest object distance cannot be made sufficiently short. In other words, if the conventional method in which focusing takes place by zooming out the first lens unit is employed, the illuminance at the shortest focal length drops markedly during focusing onto an object at a short distance. Consequently, where it is desired to obtain a sufficiently short object distance, the diameter of the first lens unit must be made quite large. In addition, in the telephoto side in which the relay magnification becomes large, since the variation in aberrations at the time of focusing onto an object at a short distance is large, the shortest object distance cannot be made sufficiently short.

SUMMARY OF THE INVENTION

In light of the above, the object of the present invention is to provide a compact zoom lens system with a shortest focal length of approximately 24 mm and capable of high magnification, which can accommodate a sufficiently short shortest object distance and in which the degree in drop in illuminance and performance as focusing takes place is small.

In order to achieve the above object, the present invention is a zoom lens system that (1) is of the positive lens unit first type, i.e., the type that provides an advantageous high magnification zoom lens system capable of photo-taking in the wide angle region (2) employs the inner focus method in order to accommodate a sufficiently short shortest object distance, and (3) was devised in order to find a zooming method and an arrangement of refractive power most suitable for high magnification zooming which begins from an unconventional extremely wide angle region where the shortest focal length is approximately 24 mm.

The present invention provides a zoom lens system comprising, from the object side, a first lens unit having a positive refractive power, a second lens unit having a negative refractive power and subsequent lens units having a positive refractive power as a whole, wherein zooming from the shortest focal length to the longest focal length takes place by moving the first lens unit and at least one of the subsequent lens units to the object side, wherein focusing on an object at a short distance is performed by moving the second lens unit to the object side and wherein the total focal length of the first lens unit and the magnification of the second lens unit are established appropriately.

Using the above construction, in the present invention, a compact zoom lens system with a shortest focal length of approximately 24 mm and capable of high magnification, which can accommodate a sufficiently short shortest object distance, and in which the degree in drop in illuminance and performance during focusing is small, can be obtained.

BRIEF DESCRIPTION OF THE DRAWINGS

The features of the present invention, which are believed to be novel, are set forth with particularity in the attended claims. The features, further objects and advantages of the present invention will best be understood by reference to the following description, taken in conjunction with the accompanying drawings.

DETAILED DESCRIPTION OF THE PREFERRED EMBODIMENTS

The following description is provided to enable any person skilled in the optical field to make and use the invention, and sets forth the best modes contemplated by the inventors for carrying out the invention. Various modifications, however, will be readily apparent to those skilled in the art, since the generic principles of the invention have been defined herein specifically to provide an improved zoom lens system. The derivation of the ratios of the magnification powers and the like set forth herein can be accomplished with the assistance of a computer. The present invention represents the parameters of a compromise balance of acceptable aberrations which can be relatively easily obtained to provide the lens system of the present invention.

Figure 1:
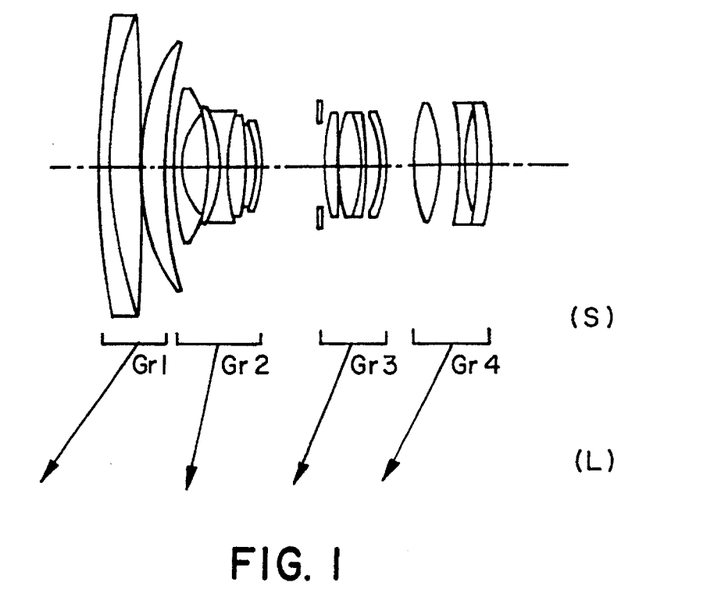
FIG. 1 shows the construction of the lens system of a first embodiment of the present invention in the shortest focal length condition.
Figure 2:
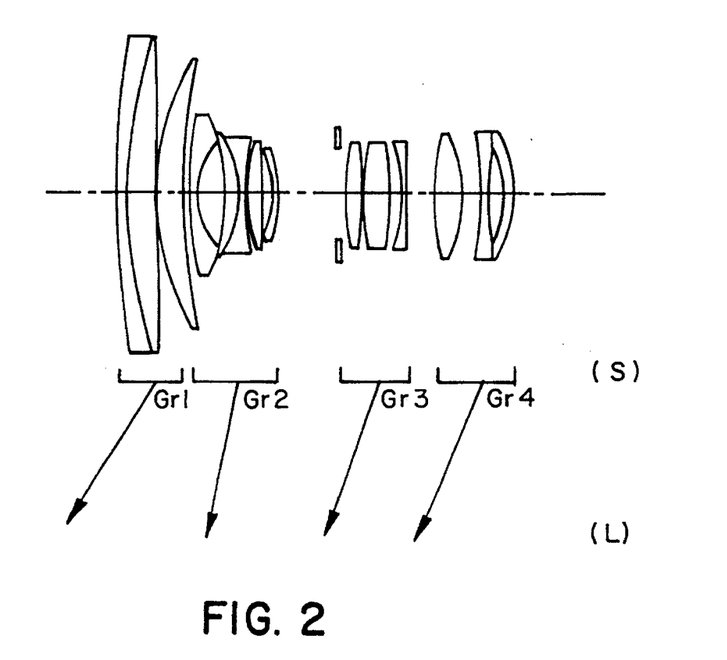
FIG. 2 shows the construction of the lens system of a second embodiment of the present invention in the shortest focal length condition.
Figure 3:
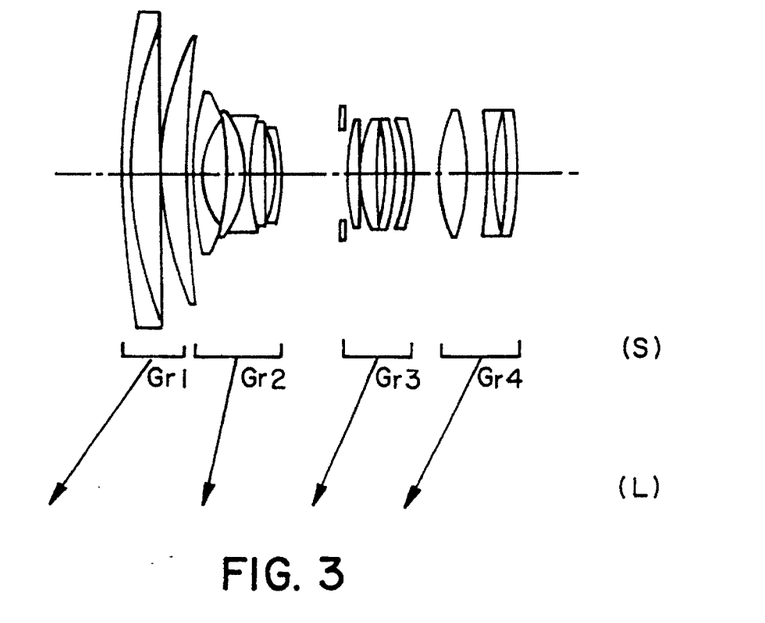
FIG. 3 shows the construction of the lens system of a third embodiment of the present invention in the shortest focal length condition.
Figure 4:
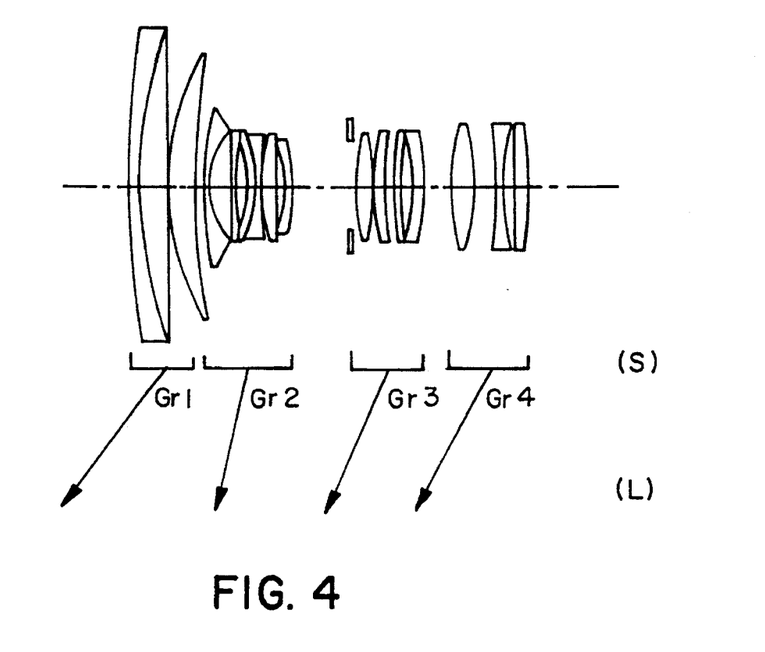
FIG. 4 shows the construction of the lens system of a fourth embodiment of the present invention in the shortest focal length condition.

Embodiments of the present invention are described in detail below. As shown in FIGS. 1 through 4, the zoom lens system of each embodiment comprises, from the object side, first lens unit Gr1 having a positive refractive power, second lens unit Gr2 having a negative refractive power, third lens unit Gr3 having a positive refractive power and fourth lens unit Gr4 having a negative refractive power. Third lens unit Gr3 and fourth lens unit Gr4 together act as the above subsequent lens units having a positive refractive power as a whole. When zooming takes place from the shortest focal length to the longest focal length, all of first lens unit Gr1 through fourth lens unit Gr4 move to the object side. However, it is sufficient to move first lens unit Gr1 and at least one of the subsequent lens units at the time of zooming. When focusing on an object at a short distance, second lens unit Gr2 is moved to the object side. Each embodiment meets the following conditions.

$$-0.5 < \beta 2T < -0.3 \qquad (1)$$

$$0.7 < f1/fT < 1.2 \qquad (2)$$

In the above conditions, $\beta 2T$ represents the magnification of the second lens unit when the camera is in focus on an object at infinity in the longest focal length condition; f1 represents the total focal length of the first lens unit; and fT represents the total focal length of the entire system in the longest focal length condition.

In the present invention, the inner focus method, in which focusing takes place by moving the second lens unit to the object side, is employed. In general, in a zoom lens system of the positive lens unit first type, the total refractive power of the first lens unit and the second lens unit should be negative on the wide angle side (retro-focus type), as a result of which the negative refractive power of the second lens unit is made large. Therefore, if the second lens unit is used as the focusing lens unit, because the amount of shift of the lens unit needed for focusing is relatively small, it is quite likely that the shortest object distance may be made short without reducing the illuminance of the image field in the shortest focal length condition. However, where a lens unit having a high refractive power is used for focusing, aberrations in photo-taking of a close object tend to increase (in the telephoto side in particular). In addition, if the relay magnification of the subsequent lens units is large, it significantly affects the correction of aberrations for the entire zoom lens system and the variation in aberrations when photographing a close object. In order to deal with this increase in aberrations, the following requirements (a) and (b) must be met.

(a) Keep the amount of shift of the second lens unit during focusing small without making its refractive power too large.

(b) Obtain a zoom solution that makes the relay magnification of the subsequent lens units as small as possible.

The above conditions (1) and (2) in the present invention were found to meet these requirements (a) and (b). Conditions (1) and (2) are explained below. The approximate amount of shift Δ of the second lens unit during focusing is given in the following equation (3).

$$\Delta = f1^2 \cdot \beta 2^2 / (\beta 2^2 - 1) \qquad (3)$$

In the above equation, f1 represents the total focal length of the first lens unit and $\beta 2$ represents the magnification of the second lens unit when the camera is in focus on an object at infinity.

In equation (3), where f1 is deemed to be a constant, in order to make $|\Delta|$ small in the range of $-1 < \beta 2 < 0$ ($\beta 2$ is always in this range with the zoom lens system of the present invention), it is necessary to make $|\beta|$ small. For example, when $\beta 2$ is $-0.4$, $|\Delta/f1^2|$ is 0.190, and when $\beta 2$ is $-0.7$, $|\Delta/f1^2|$ is 0.961. This means that where f1 stays constant, the amount of shift for focusing is different by a factor of five. Conversely, by making $|\beta 2|$ small, the total refractive power (an inverse number of the total focal length) of the first lens unit may be made small as well. Further, the fact that the total refractive power of the first lens unit can be made small means that the relay magnification of the subsequent lens units can also be made small. Based on this line of thinking, we found conditions (1) and (2) to be conditions that provide a well balanced zoom solution.

Condition (1) prescribes the magnification of the second lens unit in the longest focal length condition. Naturally, the magnification of the second lens unit in the shortest focal length condition also varies depending on the magnification in the longest focal length condition. Where the lower limit of this condition is exceeded, the amount of shift of the second lens unit for focusing becomes large, and the variation in aberrations when a close object is photographed in the longest focal length condition increases. In addition, it becomes necessary to increase the distance between the first lens unit and the second lens unit, which makes it difficult to have sufficient illuminance in the shortest focal length condition. Conversely, where the upper limit is exceeded, the absolute value of the magnification of the second lens unit becomes too small, causing the relay magnification of the subsequent lens units to become large, as a result of which the correction of aberrations for the entire system becomes difficult and the aberrations during focusing increase.

Condition (2) prescribes the total focal length of the first lens unit (the inverse number of the total refractive power). This condition indicates a solution that makes the total refractive power of the first lens unit as small as possible assuming that focusing is performed using the second lens unit. Where the lower limit of this condition is exceeded, the refractive power of the first lens unit becomes large, causing the relay magnification of the subsequent lens units to become large. Conversely, where the upper limit is exceeded, the amount of shift of the first lens unit via zooming becomes too large, which is not desirable. Furthermore, making the refractive power of the first lens unit small leads to making the refractive power of the second lens unit, which is the focusing lens unit, small as well. This is obvious considering the case in which the total refractive powers of the front lens units (first and second lens units) are made the same in the shortest focal length condition. Based on the above, it can be understood that it is preferable to meet conditions (1) and (2) in order to achieve the above requirements (a) and (b).

Furthermore, in the present invention it is preferable for there to be at least one aspherical surface in the second lens unit. The purpose of this is to effectively correct the distortion in the shortest focal length condition which is difficult in a zoom lens system capable of extremely wide-angle photo-taking. Further, it is also effective in reducing the amount of variation in aberrations during focusing.

In addition, it is also preferable for there to be at least one aspherical surface in the subsequent lens units to compensate for the variation in spherical aberration and correction of sagittal flaring in the entire zoom range.

Other preferable conditions in the zoom lens system of the present invention are described below.

The zoom lens system of each embodiment has a cemented lens in the first and second lens units and meets the following conditions.

$$vp - vn > 40 \quad (4)$$

$$|nn - np| < 0.12 \quad (5)$$

In the above conditions, vp represents the Abbe number of the positive lens of the cemented lens in the first lens unit; n represents the Abbe number of the negative lens of the cemented lens in the first lens unit; np represents the refractive index of the positive lens of the cemented lens in the second lens unit; and nn represents the refractive index of the negative lens of the cemented lens in the second lens unit.

Where condition (4) is not met, the refractive powers of the positive lens and the negative lens comprising the cemented lens must be made large to compensate for the chromatic aberrations occurring in the first lens unit. This leads to making the curvature of the cemented surfaces large, thereby making the lens thick, which hinders the obtaining of good illuminance in the wide-angle side.

Where condition (5) is not met, the chromatic and coma aberrations occurring in the second lens unit increase in the telephoto side.

Tables 1 through 4 below show embodiments 1 through 4 of the present invention. In each embodiment, all of first lens unit I through fourth lens unit IV move toward the object side during the zooming from the wide angle side to the telephoto side. In each embodiment, f represents the focal length of the entire system; ri (i=1, 2, 3, ...) represents the radius of curvature of the ith lens surface from the object side; di (i=1, 2, 3, ...) represents the ith axial distance from the object side; and Ni (i=1, 2, 3, ...) and vi (i=1, 2, 3, ...) represent the refractive index and the Abbe number, to the d-line (λ=587.6 nm), of the ith lens from the object side, respectively. The surfaces marked with asterisks in the radius of curvature column are aspherical, and are defined by the following equation which represents a surface configuration of an aspherical surface. incidentally, D(n) among the coefficients of aspherical surfaces represents the nth power of 10.

$$X(y) = (r/\epsilon) \cdot \{1 - (1 - \epsilon \cdot y^2/r^2)^{1/2}\} + \sum_{i \geq 2} A_i y^i$$

Although the numerical values indicating the embodiments represent only those in which the subsequent lens units comprise third and fourth lens units, both of which have a positive refractive power, naturally the present invention is not limited to these.

Figures 5A, 5B:
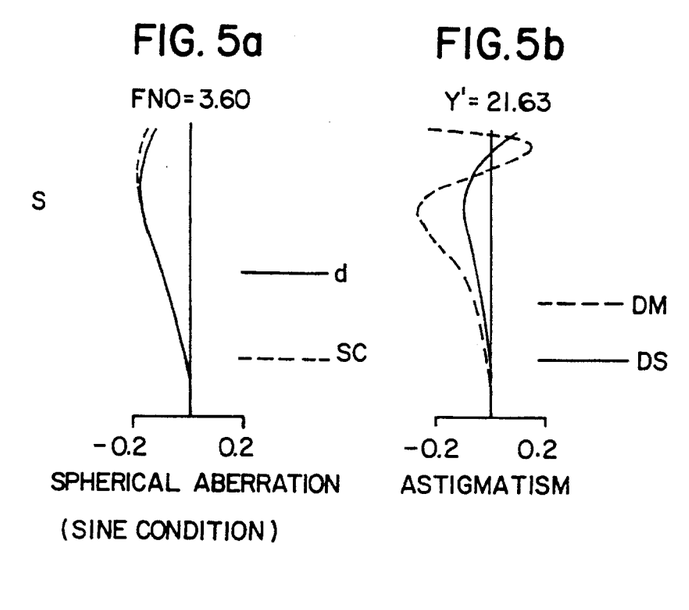
FIGS. 5a through 5c show aberration curves of the first embodiment in the shortest focal length condition (focal length =24.70 mm).
Figure 5C:
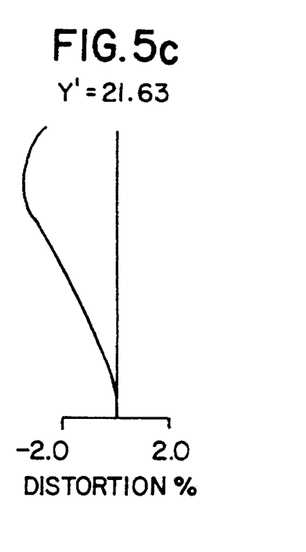
Figure 6A:
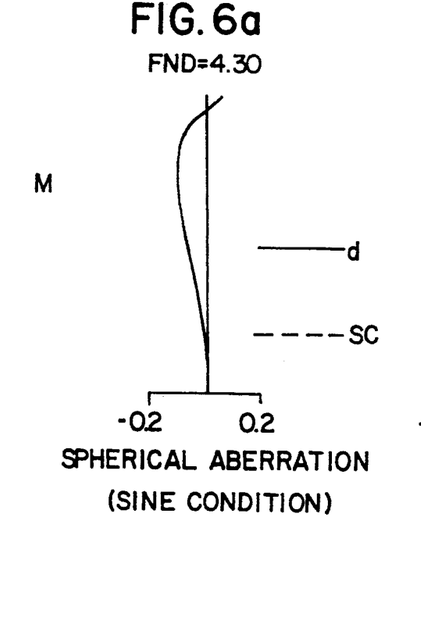
FIGS. 6a through 6c show aberration curves of the first embodiment in the middle focal length condition (focal length =50.00 mm).
Figure 6B:
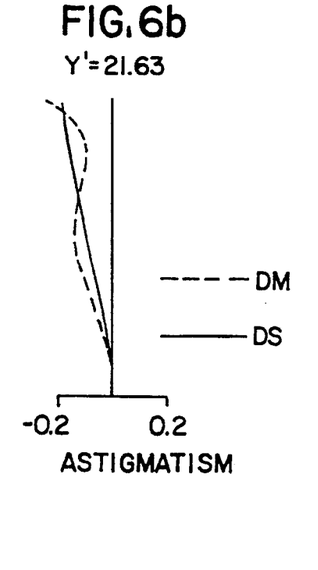
Figure 6C:
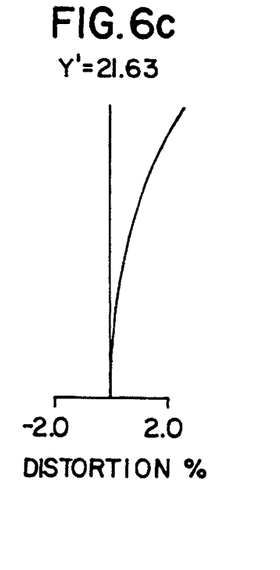
Figure 7A:
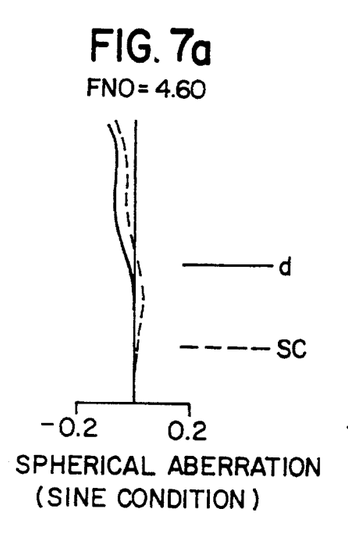
FIGS. 7a through 7c show aberration curves of the first embodiment in the longest focal length condition (focal length =82.50 mm).
Figure 7B:
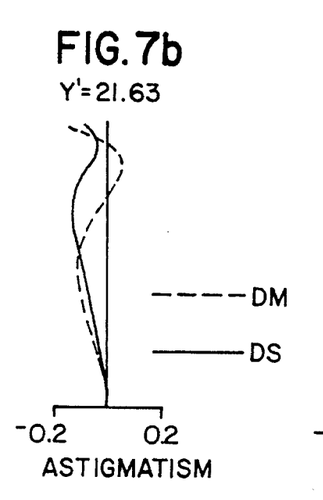
Figure 7C:
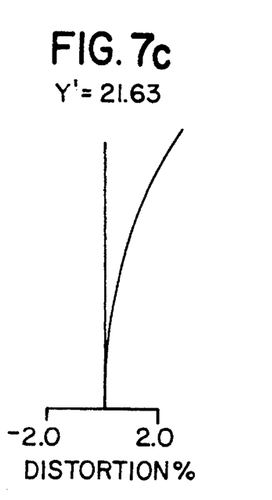
Figure 8A:
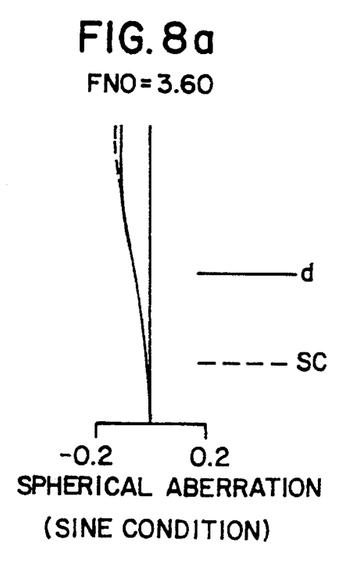
FIGS. 8a through 8c show aberration curves of the second embodiment in the shortest focal length condition (focal length =24.70 mm).
Figure 8B:
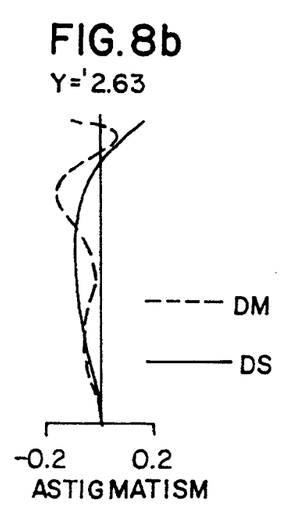
Figure 8C:
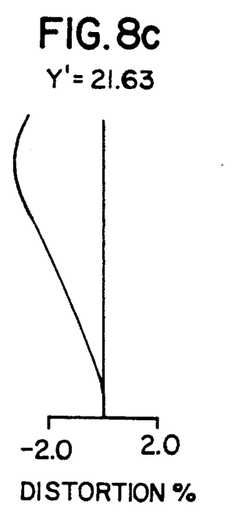
Figure 9A:
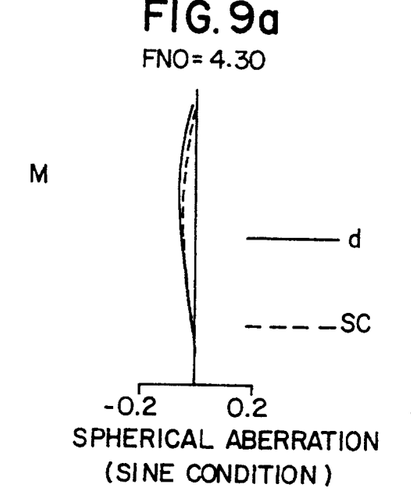
FIGS. 9a through 9c show aberration curves of the second embodiment in the middle focal length condition (focal length =50.00 mm).
Figure 9B:
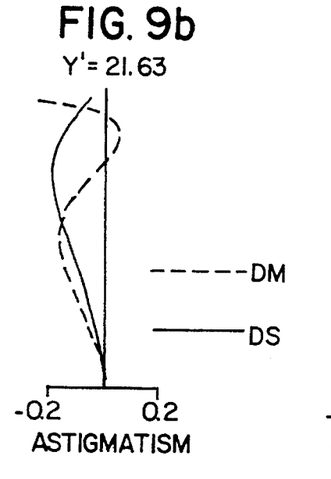
Figure 9C:
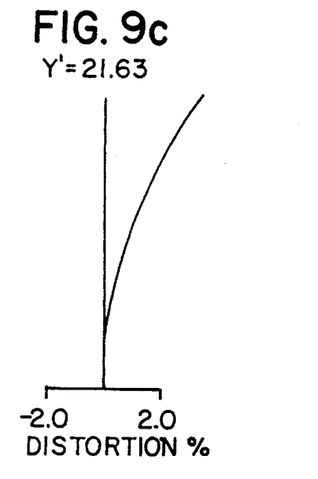
Figure 10A:
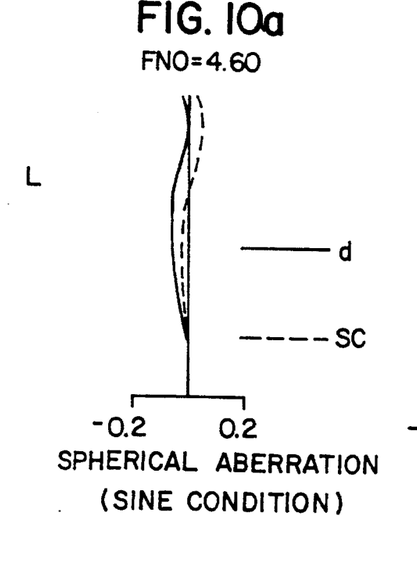
FIGS. 10a through 10c show aberration curves of the second embodiment in the longest focal length condition (focal length =82.50 mm).
Figure 10B:
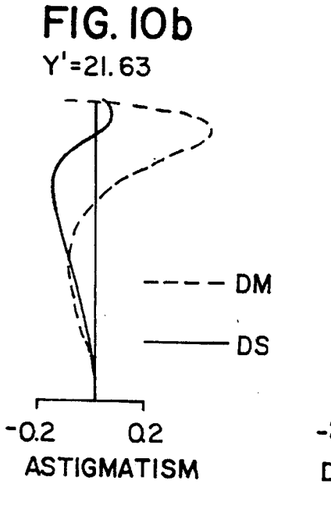
Figure 10C:
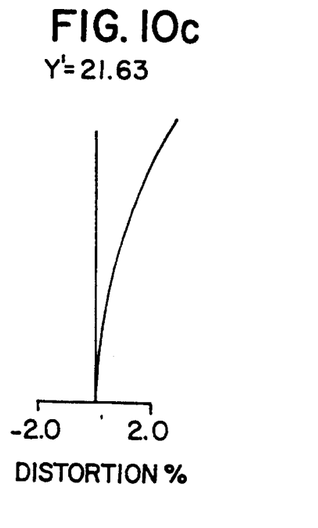
Figures 11A, 11B, 11C:
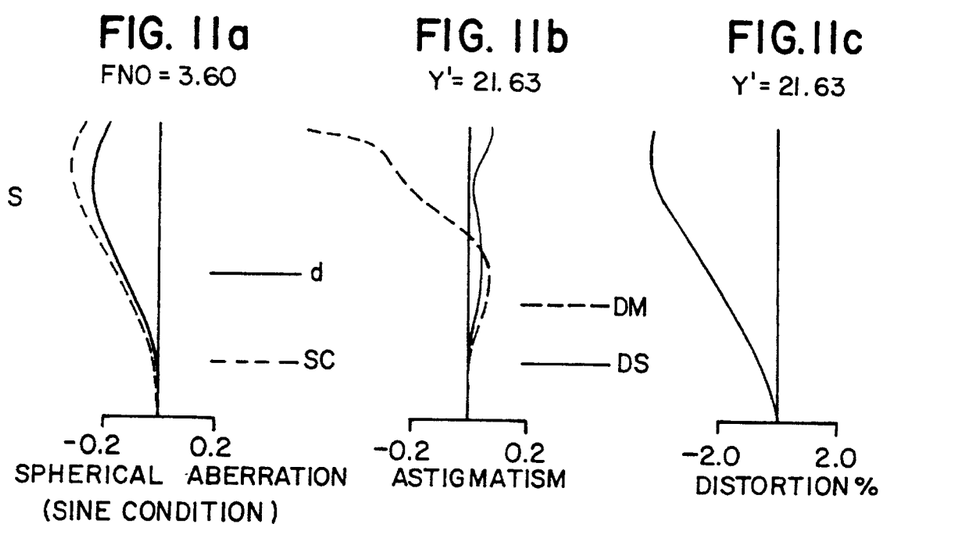
FIGS. 11a through 11c show aberration curves of the third embodiment in the shortest focal length condition (focal length =24.70 mm).
Figures 12A, 12B:
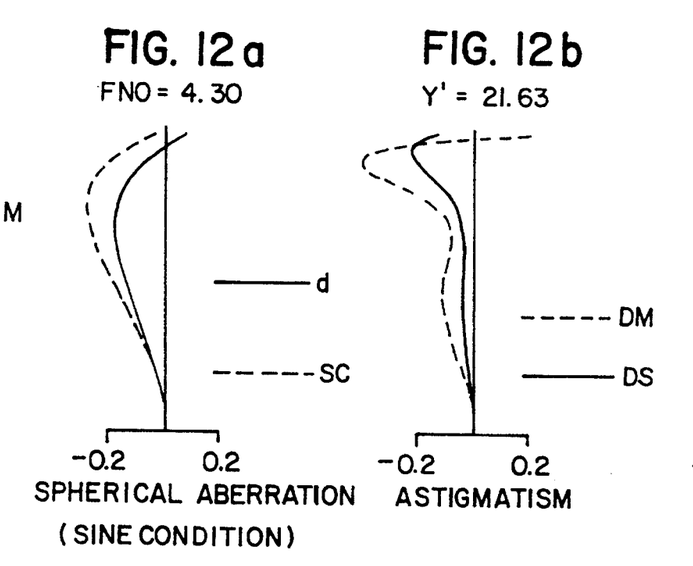
FIGS. 12a through 12c show aberration curves of the third embodiment in the middle focal length condition (focal length =50.00 mm).
Figure 12C:
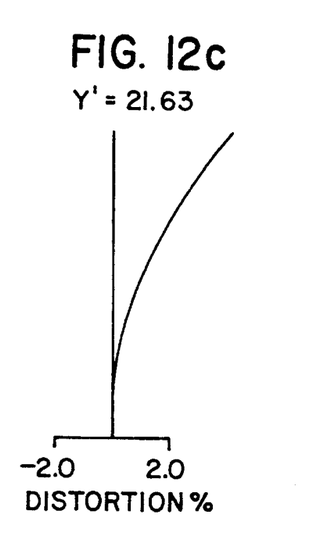
Figure 13A:
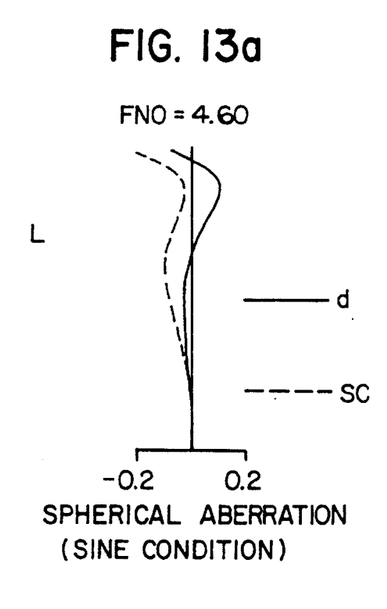
FIGS. 13a through 13c show aberration curves of the third embodiment in the longest focal length condition (focal length =82.50 mm).
Figure 13B:
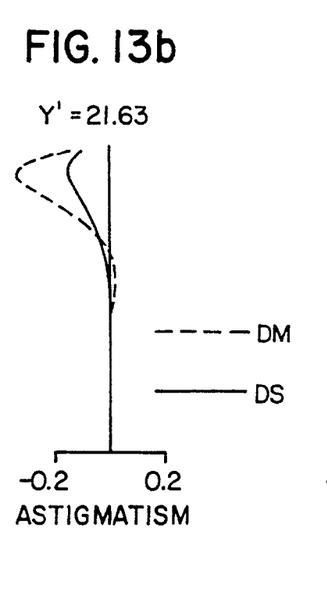
Figure 13C:
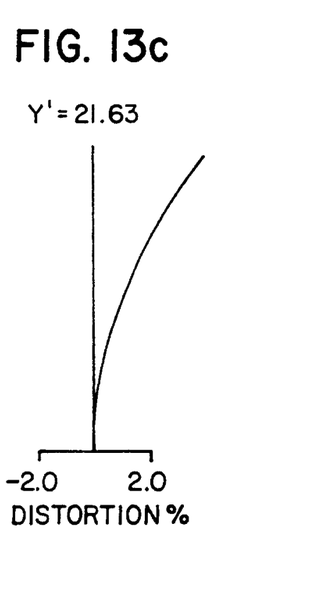
Figure 14A:
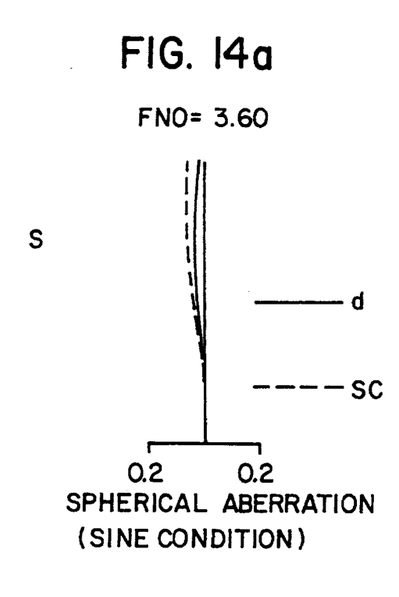
FIGS. 14a through 14c show aberration curves of the fourth embodiment in the shortest focal length condition (focal length =24.70 mm).
Figures 14B, 14C:
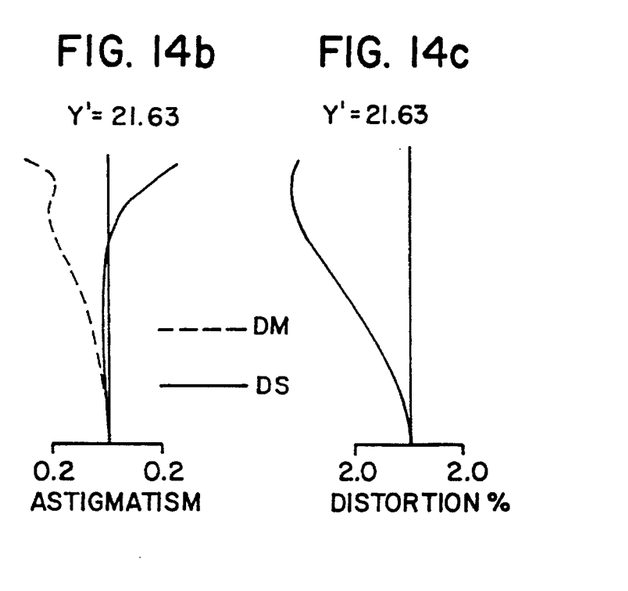
Figure 15:
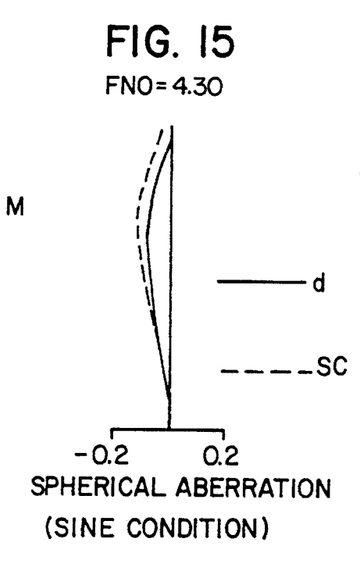
FIGS. 15a through 15c show aberration curves of the fourth embodiment in the middle focal length condition (focal length =50.00 mm).
Figure 16A:
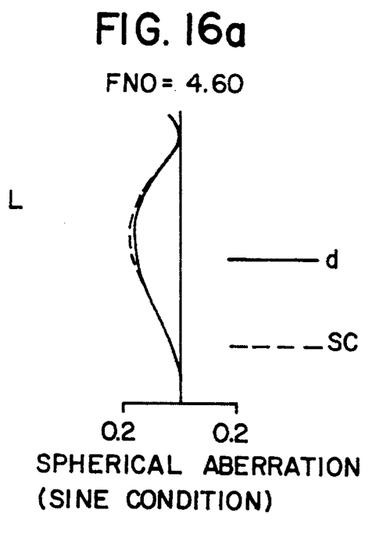
FIGS. 16a through 16c show aberration curves of the fourth embodiment in the longest focal length condition (focal length =82.50 mm).
Figure 16B:
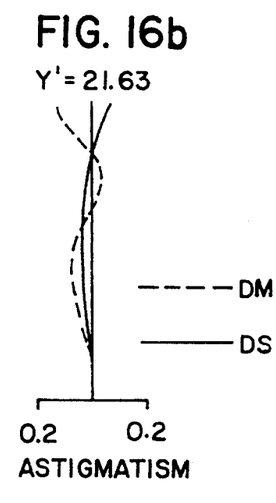
Figure 16C:
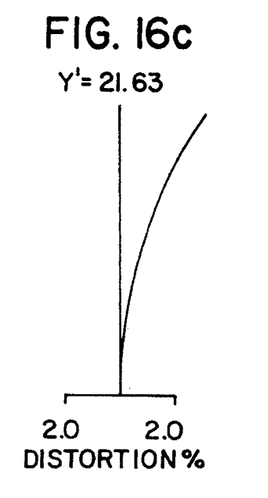

FIGS. 5a through 16c show the aberration curves of embodiments 1 through 4. In the drawings, solid line (d) represents the spherical aberration with regard to the d-line while the dotted line (SC) represents the sine condition. The dotted line (DM) and solid line (DS) represent the astigmatisms on the meridional surface and the sagittal surface, respectively.

The values for each embodiment meeting the conditions are as shown in the following Table 5.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

TABLE 1 first embodiment f = 24.70~50.00~82.50
FNO. = 3.60~4.30~4.60

| | Radius of curvature | | Axial distance | Refractive index (Nd) | | Abbe number (vd) |
|---|---|---|---|---|---|---|
| r 1 | 200.331 | d 1 | 2.000 | N 1 | 1.83350 | v 1 | 21.00 |
| r 2 | 87.000 | d 2 | 5.800 | N 2 | 1.61800 | v 2 | 63.39 |
| r 3 | −881.632 | d 3 | 0.100 | | | |
| r 4 | 41.342 | d 4 | 5.300 | N 3 | 1.69680 | v 3 | 56.47 |
| r 5 | 89.225 | d 5 | 1.700~18.237~28.537 | | | |
| r 6* | 89.225 | d 6 | 1.200 | N 4 | 1.85000 | v 4 | 40.04 |
| r 7 | 14.021 | d 7 | 5.529 | | | |
| r 8 | −45.837 | d 8 | 2.500 | N 5 | 1.67339 | v 5 | 29.25 |
| r 9 | −20.000 | d 9 | 1.047 | N 6 | 1.77250 | v 6 | 49.77 |
| r 10 | 32.707 | d 10 | 0.291 | | | |
| r 11 | 27.191 | d 11 | 3.829 | N 7 | 1.75000 | v 7 | 25.14 |
| r 12 | −45.555 | d 12 | 1.770 | | | |
| r 13 | −17.951 | d 13 | 1.067 | N 8 | 1.75450 | v 8 | 51.57 |
| r 14 | −32.035 | d 14 | 12.153~4.736~0.800 | | | |
| r 15 | INF | d 15 | 1.000 | | | |
| r 16 | 39.112 | d 16 | 2.500 | N 9 | 1.51728 | v 9 | 69.68 |
| r 17 | 809.822 | d 17 | 0.120 | | | |
| r 18 | 32.542 | d 18 | 4.500 | N 10 | 1.51728 | v 10 | 69.68 |
| r 19 | −32.000 | d 19 | 1.200 | N 11 | 1.75000 | v 11 | 25.14 |
| r 20 | −49.976 | d 20 | 2.400 | | | |
| r 21 | −20.751 | d 21 | 1.300 | N 12 | 1.84666 | v 12 | 23.82 |
| r 22 | −27.418 | d 22 | 5.500~1.900~0.900 | | | |
| r 23 | 29.615 | d 23 | 5.000 | N 13 | 1.51680 | v 13 | 64.20 |
| r 24 | −35.009 | d 24 | 4.000 | | | |
| r 25* | 983.574 | d 25 | 1.200 | N 14 | 1.80741 | v 14 | 31.59 |
| r 26 | 34.487 | d 26 | 2.500 | | | |
| r 27 | −85.278 | d 27 | 2.500 | N 15 | 1.61800 | v 15 | 63.39 |
| r 28 | −54.099 | | | | | |

Aspherical coefficients r 6: ε = 1.0000    A 4 = 0.12862808 × D(−4)
A 6 = −0.37909389 × D(−7)    A 8 = 0.41089011 × D(−9)
A 10 = −0.25029973 × D(−11)    A 12 = 0.66662793 × D(−14)

r 25: ε = 1.0000    A 4 = −0.38080810 × D(−4)
A 6 = −0.30366334 × D(−7)    A 8 = −0.43280206 × D(−9)
A 10 = 0.27238910 × D(−12)    A 12 = 0.11216660 × D(−13)

TABLE 2 second embodiment f = 24.70~50.00~82.50
FNO. = 3.60~4.30~4.60

| | Radius of curvature | | Axial distance | Refractive index (Nd) | | Abbe number (vd) |
|---|---|---|---|---|---|---|
| r 1 | 184.961 | d 1 | 2.000 | N 1 | 1.83350 | v 1 | 21.00 |
| r 2 | 84.034 | d 2 | 5.700 | N 2 | 1.61800 | v 2 | 63.39 |
| r 3 | −1406.193 | d 3 | 0.100 | | | |
| r 4 | 43.462 | d 4 | 5.300 | N 3 | 1.69680 | v 3 | 56.47 |
| r 5 | 100.922 | d 5 | 1.850~18.567~28.863 | | | |
| r 6* | 100.922 | d 6 | 1.335 | N 4 | 1.85000 | v 4 | 40.04 |
| r 7 | 14.217 | d 7 | 5.600 | | | |
| r 8 | −44.479 | d 8 | 3.100 | N 5 | 1.75000 | v 5 | 25.14 |
| r 9 | −17.094 | d 9 | 1.050 | N 6 | 1.77250 | v 6 | 49.77 |
| r 10 | 43.698 | d 10 | 0.500 | | | |

TABLE 2-continued

| | | | | | | | |
|---|---|---|---|---|---|---|---|
| r 11 | 32.415 | d 11 | 2.900 | N 7 | 1.75000 | v 7 | 25.14 |
| r 12 | −92.672 | d 12 | 1.900 | | | | |
| r 13 | −18.201 | d 13 | 1.100 | N 8 | 1.75450 | v 8 | 51.57 |
| r 14 | −26.737 | d 14 | 12.178~4.755~0.800 | | | | |
| r 15 | INF | d 15 | 1.000 | | | | |
| r 16 | 33.660 | d 16 | 3.600 | N 9 | 1.51728 | v 9 | 69.43 |
| r 17 | −60.204 | d 17 | 0.120 | | | | |
| r 18 | 31.125 | d 18 | 5.400 | N 10 | 1.51680 | v 10 | 64.20 |
| r 19 | −56.466 | d 19 | 2.300 | | | | |
| r 20 | −25.519 | d 20 | 1.300 | N 11 | 1.84666 | v 11 | 23.82 |
| r 21 | −160.204 | d 21 | 5.500~1.950~0.900 | | | | |
| r 22 | 47.740 | d 22 | 5.000 | N 12 | 1.51680 | v 12 | 64.20 |
| r 23 | −26.191 | d 23 | 4.000 | | | | |
| r 24* | −250.000 | d 24 | 1.600 | N 13 | 1.78100 | v 13 | 44.55 |
| r 25 | 69.649 | d 25 | 2.900 | | | | |
| r 26 | −27.027 | d 26 | 1.900 | N 14 | 1.61800 | v 14 | 63.39 |
| r 27 | −23.537 | | | | | | |

Aspherical coefficients r 6:  $\epsilon = 1.0000$      $A\,4 = 0.11510314 \times D(-4)$
      $A\,6 = -0.50029378 \times D(-7)$      $A\,8 = 0.48420626 \times D(-9)$
      $A\,10 = -0.26642103 \times D(-11)$    $A\,12 = 0.59695008 \times D(-14)$ r 24: $\epsilon = 1.0000$      $A\,4 = -0.36096279 \times D(-4)$
      $A\,6 = -0.71324528 \times D(-7)$      $A\,8 = 0.37287565 \times D(-9)$
      $A\,10 = -0.57986021 \times D(-11)$    $A\,12 = 0.21293063 \times D(-13)$

TABLE 3 third embodiment $f = 24.70$~$50.00$~$82.50$
$FNO. = 3.60$~$4.30$~$4.60$

| Radius of curvature | | Axial distance | | Refractive index (Nd) | | Abbe number (vd) | |
|---|---|---|---|---|---|---|---|
| r 1 | 137.513 | d 1 | 2.000 | N 1 | 1.83350 | v 1 | 21.00 |
| r 2 | 74.074 | d 2 | 4.900 | N 2 | 1.61800 | v 2 | 63.39 |
| r 3 | 382.994 | d 3 | 0.100 | | | | |
| r 4 | 48.894 | d 4 | 5.300 | N 3 | 1.69680 | v 3 | 56.47 |
| r 5 | 162.786 | d 5 | 1.700~18.770~29.409 | | | | |
| r 6 | 55.474 | d 6 | 1.200 | N 4 | 1.87800 | v 4 | 38.14 |
| r 7 | 13.407 | d 7 | 5.800 | | | | |
| r 8 | −39.715 | d 8 | 3.000 | N 5 | 1.67339 | v 5 | 29.25 |
| r 9 | −18.519 | d 9 | 1.047 | N 6 | 1.77250 | v 6 | 49.77 |
| r 10 | 33.245 | d 10 | 0.291 | | | | |
| r 11 | 27.007 | d 11 | 3.200 | N 7 | 1.75000 | v 7 | 25.14 |
| r 12 | −100.000 | d 12 | 1.770 | | | | |
| r 13 | −28.571 | d 13 | 1.067 | N 8 | 1.75450 | v 8 | 51.57 |
| r 14 | −42.242 | d 14 | 12.167~4.742~0.800 | | | | |
| r 15 | INF | d 15 | 1.000 | | | | |
| r 16 | 43.077 | d 16 | 2.500 | N 9 | 1.51728 | v 9 | 69.68 |
| r 17 | −257.270 | d 17 | 0.120 | | | | |
| r 18 | 29.741 | d 18 | 3.000 | N 10 | 1.69100 | v 10 | 54.75 |
| r 19 | 183.651 | d 19 | 1.600 | | | | |
| r 20 | −55.769 | d 20 | 2.300 | N 11 | 1.69100 | v 11 | 54.75 |
| r 21 | −32.674 | d 21 | 1.800 | | | | |
| r 22 | −22.701 | d 22 | 1.300 | N 12 | 1.84666 | v 12 | 23.82 |
| r 23 | −44.920 | d 23 | 5.500~1.900~0.900 | | | | |
| r 24 | 31.509 | d 24 | 5.100 | N 13 | 1.51680 | v 13 | 64.20 |
| r 25 | −32.771 | d 25 | 4.000 | | | | |

TABLE 3-continued

| | | | | | | | |
|---|---|---|---|---|---|---|---|
| r 26* | −501.251 | d 26 | 1.200 | N 14 | 1.80741 | v 14 | 31.59 |
| r 27 | 42.214 | d 27 | 2.500 | | | | |
| r 28 | −112.340 | d 28 | 2.500 | N 15 | 1.61800 | v 15 | 63.39 |
| r 29 | −56.301 | | | | | | |

Aspherical coefficients r 26 $\epsilon = 1.0000$      $A\,4 = -0.35584233 \times D(-4)$
     $A\,6 = -0.53219723 \times D(-7)$      $A\,8 = -0.44470087 \times D(-9)$
     $A\,10 = 0.26082273 \times D(-11)$     $A\,12 = -0.36865428 \times D(-14)$

TABLE 4 fourth embodiment $f = 24.70$~$50.00$~$82.50$
$FNO. = 3.60$~$4.30$~$4.60$

| Radius of curvature | | Axial distance | | Refractive index (Nd) | | Abbe number (vd) | |
|---|---|---|---|---|---|---|---|
| r 1 | 186.032 | d 1 | 2.000 | N 1 | 1.83350 | v 1 | 21.00 |
| r 2 | 86.957 | d 2 | 5.200 | N 2 | 1.61800 | v 2 | 63.39 |
| r 3 | 9763.718 | d 3 | 0.100 | | | | |
| r 4 | 46.687 | d 4 | 5.400 | N 3 | 1.69680 | v 3 | 56.47 |
| r 5 | 127.681 | d 5 | 1.700~18.666~29.330 | | | | |
| r 6 | 53.619 | d 6 | 1.200 | N 4 | 1.87800 | v 4 | 38.14 |
| r 7 | 14.156 | d 7 | 4.200 | | | | |
| r 8 | −4745.859 | d 8 | 1.200 | N 5 | 1.87800 | v 5 | 38.14 |
| r 9 | 63.162 | d 9 | 1.900 | | | | |
| r 10 | −37.678 | d 10 | 2.200 | N 6 | 1.83350 | v 6 | 21.00 |
| r 11 | −20.408 | d 11 | 1.100 | N 7 | 1.75450 | v 7 | 51.57 |
| r 12 | 167.378 | d 12 | 0.200 | | | | |
| r 13 | 40.426 | d 13 | 2.400 | N 8 | 1.75000 | v 8 | 25.14 |
| r 14 | −113.355 | d 14 | 1.700 | | | | |
| r 15 | −21.876 | d 15 | 1.100 | N 9 | 1.75450 | v 9 | 51.57 |
| r 16 | −33.148 | d 16 | 11.906~4.669~0.800 | | | | |
| r 17 | INF | d 17 | 1.000 | | | | |
| r 18 | 37.574 | d 18 | 3.000 | N 10 | 1.51728 | v 10 | 69.68 |
| r 19 | −73.279 | d 19 | 0.120 | | | | |
| r 20 | 36.480 | d 20 | 2.800 | N 11 | 1.69100 | v 11 | 54.75 |
| r 21 | 83.717 | d 21 | 1.400 | | | | |
| r 22 | 79.292 | d 22 | 1.800 | N 12 | 1.71300 | v 12 | 53.93 |
| r 23 | 866.686 | d 23 | 2.200 | | | | |
| r 24 | −26.948 | d 24 | 1.300 | N 13 | 1.84666 | v 13 | 23.82 |
| r 25 | −67.630 | d 25 | 5.500~1.900~0.900 | | | | |
| r 26 | 32.551 | d 26 | 5.100 | N 14 | 1.51680 | v 14 | 64.20 |
| r 27 | −30.342 | d 27 | 4.000 | | | | |
| r 28* | 1085.529 | d 28 | 1.200 | N 15 | 1.80741 | v 15 | 31.59 |
| r 29 | 39.413 | d 29 | 2.500 | | | | |
| r 30 | 349.868 | d 30 | 2.500 | N 16 | 1.61800 | v 16 | 63.39 |
| r 31 | −97.537 | | | | | | |

Aspherical coefficients r 28 $\epsilon = 1.0000$      $A\,4 = -0.32952935 \times D(-4)$
     $A\,6 = -0.58537869 \times D(-7)$      $A\,8 = -0.36719645 \times D(-10)$
     $A\,10 = -0.14027703 \times D(-11)$    $A\,12 = 0.90905939 \times D(-14)$

TABLE 5

| Claimed inequality | (1) $-0.5 < \beta_T < -0.3$ | (2) $0.7 < f_1/f_T < 1.2$ | (4) $v_p - v_n > 40$ | (5) $|n_n - n_p| < 0.12$ |
|---|---|---|---|---|
| Embodiment 1 | $\beta_{2T} = -0.401$ | $f_1/f_T = 1.03$ | $v_p - v_n = 42.4$ | $|n_n - n_p| = 0.099$ |
| Embodiment 2 | −0.403 | 1.03 | 42.4 | 0.023 |
| Embodiment 3 | −0.396 | 1.05 | 42.4 | 0.099 |
| Embodiment 4 | −0.395 | 1.04 | 42.4 | 0.079 |

What is claimed is:

1. A zoom lens comprising, from an object side, a first lens unit having a positive refractive power;

a second lens unit having a negative refractive power; and subsequent lens units having a positive refractive power as a whole, wherein zooming from a shortest focal length to a longest focal length takes place by moving the first lens unit and at least one of the subsequent lens units to the object side, wherein focusing on an object at a short distance is performed by moving the second lens unit to the object side, and wherein the zoom lens system fulfills the following condition:

$-0.5 < \beta 2T < -0.3$

β2T: a magnification of the second lens unit when the zoom lens system is in focus on an object at infinity in the longest focal length condition.

2. A zoom lens system as claimed in claim 1, wherein the zoom lens system fulfills the following condition:

$0.7 < f1/fT < 1.2$ f1: total focal length of the first lens unit, fT: total focal length of the zoom lens in the longest focal length condition.

3. A zoom lens system as claimed in claim 1, wherein at least one surface of the second lens unit is constructed to be aspherical.

4. A zoom lens system as claimed in claim 1, wherein at least one surface of the subsequent lens units is constructed to be aspherical.

5. A zoom lens system as claimed in claim 1, wherein the first lens unit includes a cemented lens.

6. A zoom lens system as claimed in claim 5, wherein the zoom lens system fulfills the following condition:

$vp - vn > 40$ vp: an Abbe number of the positive lens of the cemented lens in the first lens unit, vn: an Abbe number of the negative lens of the cemented lens in the first lens unit.

7. A zoom lens system as claimed in claim 1, wherein the second lens unit includes a cemented lens.

8. A zoom lens system as claimed in claim 7, wherein the zoom lens system fulfills the following condition:

$|np - nn| < 0.12$ np: a refractive index of the positive lens of the cemented lens in the second lens unit, nn: a refractive index of the negative lens of the cemented lens in the second lens unit.

9. A zoom lens consisting of, from an object side, a first lens unit having a positive refractive power;

a second lens unit having a negative refractive power;

a third lens unit having a positive refractive power; and a fourth lens unit having a positive refractive power, wherein zooming from a wide-angle side to a telephoto side takes place by moving all of the first lens unit through the fourth lens unit to the object side, wherein focusing on an object at a short distance is performed by moving the second lens unit to the object side, and wherein the zoom lens system fulfills the following condition:

$-0.5 < \beta 2T < -0.3$

β2T: a magnification of the second lens unit when the zoom lens system is in focus on an object at infinity in the longest focal length condition.

10. A zoom lens system as claimed in claim 9, wherein the zoom lens system fulfills the following condition:

$0.7 < f1/fT < 1.2$ f1: total focal length of the first lens unit, fT: total focal length of the zoom lens system in the longest focal length condition.

11. A zoom lens system as claimed in claim 9, wherein one surface of the second lens unit is constructed to be aspherical.

12. A zoom lens system as claimed in claim 9, wherein one surface of the fourth lens unit is constructed to be aspherical.

13. A zoom lens system as claimed in claim 9, wherein the first lens unit includes a cemented lens.

14. A zoom lens system as claimed in claim 13, wherein the zoom lens system fulfills the following condition:

$vp - vn > 40$ vp: an Abbe number of the positive lens of the cemented lens in the first lens unit, n: an Abbe number of the negative lens of the cemented lens in the first lens unit.

15. A zoom lens system as claimed in claim 9, wherein the second lens unit includes a cemented lens.

16. A zoom lens system as claimed in claim 15, wherein the zoom lens system fulfills the following condition:

$|np - nn| < 0.12$ np: a refractive index of the positive lens of the cemented lens in the second lens unit, nn: a refractive index of the negative lens of the cemented lens in the second lens unit.

17. A zoom lens consisting of, from an object side, a first lens unit having a positive refractive power;

a second lens unit having a negative refractive power, one surface of said second lens unit being constructed to be aspherical;

a third lens unit having a positive refractive power; and a fourth lens unit having a positive refractive power, one surface of said fourth lens unit being constructed to be aspherical, wherein zooming from a wide-angle side to a telephoto side takes place by moving all of the first lens unit through the fourth lens unit to the object side, wherein focusing on an object at a short distance is performed by moving the second lens unit to the object side, and wherein the zoom lens system fulfills the following conditions:

$-0.5 < \beta 2T < -0.3$ $0.7 < f1/fT < 1.2$ $\beta 2T$: a magnification of the second lens unit when the zoom lens system is in focus on an object at infinity in the longest focal length condition, f1: total focal length of the first lens unit, fT: total focal length of the entire system in the longest focal length condition.

18. A zoom lens system as claimed in claim 17, wherein the zoom lens system has a cemented lens in the first and second lens unit and meets the following conditions, $\nu p - \nu n > 40$ $|np - nn| < 0.12$ $\nu p$: an Abbe number of the positive lens of the cemented lens in the first lens unit, $\nu n$: an Abbe number of the negative lens of the cemented lens in the first lens unit, np: a refractive index of the positive lens of the cemented lens in the second lens unit, nn: a refractive index of the negative lens of the cemented lens in the second lens unit.

* * * * *